United States Patent Office 3,244,475
Patented Apr. 5, 1966

3,244,475
SOLVENT EXTRACTION PROCESS FOR SEPARATING RHENIUM FROM MOLYBDENUM
Philip E. Churchward, Salt Lake City, Utah, assignor to the United States of America as represented by the Secretary of the Interior
No Drawing. Filed Oct. 31, 1962, Ser. No. 234,567
9 Claims. (Cl. 23—22)

The invention herein described and claimed may be manufactured and used by or for the Government of the United States of America for governmental purposes without the payment of royalties thereon or therefor.

This invention relates to a process for extracting rhenium values from an aqueous solution.

The only presently commercial sources of rhenium are certain molybdenite ores which contain the element in minute amounts. When the molybdenite is roasted rhenium is volatilized as the oxide and must be concentrated and recovered from a water solution obtained by scrubbing the flue gases or by leaching the flue dust. The rhenium must be separated from large amounts of molybdenum compounds which are always present in the dust and fumes.

Presently used methods of separation involve multiple crystallizations of potassium perrhenate or the use of ion exchange resins. Such procedures are, however, very time consuming and require the use of complex and costly apparatus.

It has now been found that rhenium may be concentrated and recovered from aqueous solutions by means of a solvent extraction process in which a particular quaternary ammonium compound is used as the essential component of the extractant. Such a process may be carried out using simple and inexpensive equipment and may be operated in a continuous manner.

The quaternary ammonium compound which has been found to make the solvent extraction process feasible is tricapryl methyl ammonium chloride, available commercially under the name of Aliquat 336 from General Mills Corporation. The compound has the formula $R_3(CH_3)NCl$ in which the R groups are saturated straight-chain, $C_8$–$C_{10}$ hydrocarbon groups with the $C_8$ group predominating.

The Aliquat 336 is employed in solution in a carrier solvent such as kerosine that is relatively immiscible with the aqueous solvent of the aqueous solution containing the rhenium and the Aliquat 336 is believed to form a compound with Re which is preferentially soluble in the carrier solvent as opposed to the aqueous solvent. Unlike primary, secondary or tertiary amines, the Aliquate 336 extracts rhenium values from alkaline solutions under conditions wherein molybdenum is not appreciably extracted. Furthermore, unlike other quaternary ammonium compounds, Aliquat 336 does not form emulsions and separates rapidly after mixing with the Re-containing aqueous solution. The compound also has a desirably low solubility in water.

In a preferred embodiment of the process the rhenium-bearing solution derived by leaching molybdenum waste flue dust or by scrubbing the off-gas from a molybdenite roaster is treated with an oxidizing agent to convert the molybdenum to the hexavalent state and the rhenium to the heptavalent state (perrhenate), neutralized to pH of 10 to 12 and contacted with a solution of the Aliquat 336 in an organic solvent such as kerosine. The contacting may be by means of mixer-settler units, extraction columns or any device suitable for solvent extraction.

After the organic and aqueous phases are allowed to separate, the rhenium is removed from the organic phase by contacting this phase with a dilute perchloric acid solution, e.g., about 0.5 to 2 molar, whereby the rhenium is transferred to the aqueous phase as perrhenic acid. The rhenium may then be recovered from this solution by known means such as precipitation with hydrogen sulfide, redissolution with hydrogen peroxide and ammonia, and crystallization of ammonium perrhenate from the resulting solution. The ammonium perrhenate thus prepared is exceptionally pure and may be used for the production of rhenium metal.

Another very effective means of recovery of the rhenium from the perchloric acid solutions by means of electrodeposition has been developed by applicant and forms the subject matter of application Serial No. 234,566, filed of even date herewith.

It has further been found that conversion of the Aliquat 336 to the perchlorate form, by shaking with perchloric acid or a perchlorate, prior to extraction results in an even better separation of rhenium and molybdenum. The amount of molybdenum extracted is thereby substantially decreased while the rhenium extraction coefficient, although somewhat decreased, remains sufficiently high for complete extraction of rhenium values by countercurrent extraction in several stages, the net result being a more effective separation of rhenium from molybdenum. In practice, in a process in which the organic reagent is recycled from the stripping operation to be reused in extraction, as in Example 2 below, the perchlorate treatment takes place in the stripping process and involves no additional steps.

The following examples will serve to more particularly describe the invention.

Example 1

A 1 liter solution containing 1.52 grams of rhenium and 26.0 grams of molybdenum was made by water leaching a flue dust from molybdenum roasters. The solution was treated with 3 grams of sodium chlorate to oxidize any reduced molybdenum and rhenium, and the pH adjusted to 12 with sodium hydroxide. One hundred milliliters of this solution was shaken in a separatory funnel for 5 minutes with one-half of its volume of 5 percent Aliquat 336 in kerosine. Less than 0.01 gram of rhenium remained in the aqueous phase and substantially no molybdenum was extracted.

The organic solution of rhenium was shaken with one-half of its volume of 1 molar perchloric acid solution for 5 minutes. Eighty percent of rhenium reported in the aqueous phase.

The organic reagent from which the rhenium was removed was shaken again with 100 ml. of new rhenium-bearing solution. Eighty-five percent of the rhenium was extracted into the organic phase. This demonstrated that the reagent could be recycled.

In a further embodiment of the invention, an additional additive such as tributyl phosphate or a higher alcohol such a primary dodecyl alcohol is added to the organic extractant in an amount of about 2 to 10%. These materials serve to increase the solubility of the rhenium-amine compound in the organic phase, thus preventing formation of an additional third phase at high rhenium concentrations. The use of such an additive is illustrated in the following example.

Example 2

In this example a continuous process was carried out as follows: A rhenium-bearing solution prepared by leaching flue dust, as previously described, was fed countercurrently to the organic extractant through a small extraction column. The rhenium-bearing solution contained 1.2 grams per liter rhenium and 24.0 grams per liter molybdenum. The organic extractant consisted of 5 percent by volume Aliquat 336, 10 percent tributyl phosphate and 85 percent kerosine.

The organic solution was stripped by contacting with 1 molar perchloric acid and recycled to extraction. Ninety-nine percent of the rhenium was extracted and finally isolated in a solution containing 15 grams per liter rhenium and only 0.001 gram per liter molybdenum.

Contacting the organic solution countercurrently in several stages with perchloric acid results in substantially complete transfer of rhenium to the aqueous phase.

Ammonium perrhenate prepared from this solution was examined spectrographically and contained less than 0.001 percent Si, Ca and Mg. No other impurities were detected. The separation is sufficiently specific that the procedure may be employed as part of an analytical procedure for determining the rhenium content of ores and beneficiation products.

The following examples illustrate the results obtained using the perchlorate form of the extractant.

*Example 3*

One-hundred milliliters of a solution made by dissolving potassium perrhenate and sodium molybdate which contained 2.4 grams of rhenium and 24 grams per liter of molybdenum was adjusted to pH 12 and shaken in a separatory funnel for 5 minutes with 33 milliliters of a kerosine solution containing 5 percent by volume Aliquat 336 in the chloride form. Ninety-nine percent of the rhenium and only 1 percent of the molybdenum was extracted.

*Example 4*

Example 3 was repeated, but the kerosine solution of Aliquat 336 was treated prior to use as a rhenium extractant by shaking with one-half of its volume of a 1-molar solution of perchloric acid. Eighty-six percent of the rhenium and substantially no molybdenum was extracted.

Since the essential stripping agent is the perchlorate ion, other reagents such as a neutral solution of sodium perchlorate may be used in place of the perchloric acid. Concentrated hydrochloric acid may also be used although it is less efficient than perchlorates.

Other oxidizing agents such as sodium hypochlorite or nitric acid may be used for oxidizing the Re and Mo prior to extraction.

The preferred range of pH is 8 to 12; it was found that molybdenum was appreciably extracted at pH values below 7. Potassium hydroxide could be used if the rhenium content of the solution was low so that potassium perrhenate would not precipitate. Sodium carbonate could be used to raise the pH to about 10 and ammonium hydroxide up to pH 8 or 9. Calcium hydroxide would seem to be a cheap and desirable neutralizing agent; however, I have found that its use results in a significant loss of rhenium from the solution. Neutralizing excess acid with calcium carbonate and then making strongly alkaline with sodium hydroxide should be possible.

The concentration of the Aliquat 336 in the organic solvent may vary considerably depending on the concentration of the rhenium and the organic solvent employed—concentrations of about 1 to 10 percent by volume are generally employed.

While kerosine is a desirable solvent because of its low price, moderately low volatility, and toxicity, it is possible to use a large number of other solvents. Aliphatic and aromatic hydrocarbons, chlorinated hydrocarbons, or ketones, such as hexane, toluene, xylene, chloroform, carbon tetrachloride, and methyl isobutyl ketone may be used.

Though the rhenium solutions in the examples were derived from roasting molybdenum ores, the process of the invention is not limited to this particular source of rhenium but is applicable to rhenium solutions generally—the perrhenate ions even in trace amounts can be separated completely from practically all known interfering elements by the process of the invention.

What is claimed is:

1. A process for separating rhenium from molybdenum in an aqueous solution containing, in an aqueous solvent, rhenium in its heptavalent state and molybdenum in its hexavalent state comprising adjusting said solution to a pH of from 8 to 12, subsequently contacting the solution with an organic extractant containing, in an organic carrier solvent, a quaternary ammonium compound having the formula $R_3(CH_3)NCl$, in which R is a saturated straight-chain alkyl radical of from 8 to 10 carbon atoms, said organic carrier solvent and said aqueous solvent being relatively immiscible liquids, whereby said contacting step results in the formation of separable aqueous and organic phases, said organic carrier solvent, with respect to said aqueous solvent, capable of preferentially dissolving rhenium-quaternary ammonium compounds that form as a result of said contacting step, whereby said contacting step results in the rhenium values in said aqueous solution being transferred to said organic phase with said molybdenum remaining in said aqueous phase, and separating said organic and aqueous phases from one another.

2. The process of claim 1 in which the organic carrier solvent is kerosine.

3. The process of claim 2 in which the concentration of the quaternary ammonium compound in the kerosine is about 1 to 10 percent by volume.

4. The process of claim 1 in which the organic extractant additionally comprises a solvent selected from the group consisting of tributyl phosphate and a higher alcohol.

5. The process of claim 1 in which the rhenium-containing aqueous solution is obtained by leaching flue dust from roasting of molybdenite ore.

6. The process of claim 1 in which the rhenium-containing aqueous solution is obtained by scrubbing flue gases from roasting of molybdenite ore.

7. The process of claim 1 further including removing rhenium values from the organic phase by stripping said phase with a reagent selected from the group consisting of perchloric acid, a soluble perchlorate and concentrated hydrochloric acid.

8. The process of claim 1 further included converting the quaternary ammonium compound to the perchlorate form, prior to extraction, by treatment with a reagent selected from the group consisting of perchloric acid and a soluble perchlorate.

9. The process of claim 1 further including removing rhenium as a perrhenic compound from the organic phase by stripping said phase with a reagent selected from the group consisting of perchloric acid and a soluble perchlorate, and recycling stripped organic phase to said contacting step as said organic extractant.

References Cited by the Examiner

UNITED STATES PATENTS

| | | | |
|---|---|---|---|
| 2,634,280 | 4/1953 | Tribalat et al. | 23—18 X |
| 2,876,065 | 3/1959 | Zimmerley et al. | 23—18 X |
| 2,877,250 | 3/1959 | Brown et al. | |
| 3,083,085 | 3/1963 | Lewis et al. | 23—22 X |

OSCAR R. VERTIZ, *Primary Examiner.*

MAURICE A. BRINDISI, BENJAMIN HENKIN,
*Examiners.*

H. T. CARTER, *Assistant Examiner.*